(12) United States Patent
Johnson

(10) Patent No.: US 7,902,457 B2
(45) Date of Patent: Mar. 8, 2011

(54) ADJUSTABLE MOUNTING BRACKET

(75) Inventor: Steven J. Johnson, Galien, MI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 12/606,387

(22) Filed: Oct. 27, 2009

(65) Prior Publication Data

US 2010/0044065 A1    Feb. 25, 2010

Related U.S. Application Data

(62) Division of application No. 11/359,768, filed on Feb. 23, 2006.

(51) Int. Cl.
*H02B 1/32* (2006.01)

(52) U.S. Cl. .......... 174/61; 174/57; 174/58; 174/63; 220/3.3; 220/3.9; 248/906; 248/200

(58) Field of Classification Search .......... 174/480, 174/481, 50, 53, 57, 58, 61, 62, 63, 54; 220/3.2–3.9, 220/4.02; 248/200, 201, 200.1, 205.1, 906, 248/220.41, 220.42, 220.43, 221.11, 225.21, 248/220.21, 300
See application file for complete search history.

(56) References Cited

U.S. PATENT DOCUMENTS

| | | |
|---|---|---|
| 1,066,706 A | 7/1912 | Caine |
| 1,206,431 A | 11/1916 | Graybill |
| 1,963,951 A | 6/1934 | Bowers |
| 2,374,622 A | 4/1945 | Rugg |
| 2,451,143 A | 10/1948 | Ammerman |
| 2,480,805 A | 8/1949 | Buckels |
| 2,712,917 A | 7/1955 | Flora et al. |
| 3,403,641 A | 10/1968 | Baker |
| 3,491,820 A | 1/1970 | Ostling |
| 4,183,486 A | 1/1980 | Esoldi |
| 4,399,922 A | 8/1983 | Horsley |
| 4,447,030 A | 5/1984 | Nattel |
| 4,462,564 A | 7/1984 | Alves et al. |
| 4,533,060 A | 8/1985 | Medlin |
| 4,569,458 A | 2/1986 | Horsley |
| 4,572,391 A | 2/1986 | Medlin |
| 4,603,789 A | 8/1986 | Medlin, Sr. |
| 4,645,089 A | 2/1987 | Horsley |
| 4,688,693 A | 8/1987 | Medlin, Jr. |
| 4,732,356 A | 3/1988 | Medlin, Sr. |
| 4,757,908 A | 7/1988 | Medlin, Sr. |
| 4,964,525 A | 10/1990 | Coffey et al. |
| 5,005,792 A | 4/1991 | Rinderer |
| 5,176,345 A | 1/1993 | Medlin |
| 5,211,580 A | 5/1993 | Schuplin |
| 5,263,676 A | 11/1993 | Medlin et al. |
| 5,452,873 A * | 9/1995 | Laughlin .............. 248/205.1 |
| 5,595,362 A | 1/1997 | Rinderer et al. |

(Continued)

*Primary Examiner* — Angel R Estrada
(74) *Attorney, Agent, or Firm* — Garrett V. Davis; Mark S. Bicks; Alfred N. Goodman

(57) ABSTRACT

A mounting bracket for supporting an electrical box or other electrical device to a wall stud is adapted to contact an opposing wall to resist movement of the bracket. The bracket includes a front plate and a support plate extending perpendicular to the front plate and having a length to engage the opposing wall. The extension plate is integrally formed with the support plate and can be folded to an outward extended position to increase the effective length of the stabilizing plate to accommodate wall cavities of different depths. The extension plate includes fold lines so that an end portion can be bent to shorten the effective length of the extension plate.

35 Claims, 5 Drawing Sheets

U.S. PATENT DOCUMENTS

| | | | |
|---|---|---|---|
| 5,646,371 A * | 7/1997 | Fabian | 174/58 |
| 5,810,303 A | 9/1998 | Bourassa et al. | |
| 5,964,438 A | 10/1999 | Camilleri | |
| 6,590,155 B2 | 7/2003 | Vrame et al. | |
| 6,765,146 B1 | 7/2004 | Gerardo | |
| 6,956,172 B2 | 10/2005 | Dinh | |
| 7,036,782 B2 | 5/2006 | Cheatham et al. | |
| 7,036,982 B2 | 5/2006 | Smith et al. | |
| 7,053,300 B2 | 5/2006 | Denier et al. | |
| 7,073,757 B2 | 7/2006 | Johnson et al. | |
| 7,344,115 B2 | 3/2008 | Case | |
| 7,439,443 B2 * | 10/2008 | Dinh | 174/58 |
| 7,659,477 B2 * | 2/2010 | Korcz et al. | 174/58 |
| 2008/0029287 A1 | 2/2008 | Korcz et al. | |

* cited by examiner

ADJUSTABLE MOUNTING BRACKET

CROSS-REFERENCE TO RELATED APPLICATION

This application is a divisional application of Ser. No. 11/359,768, filed Feb. 23, 2006.

FIELD OF THE INVENTION

The present invention is directed to a mounting bracket for an electrical box or other electrical component. The invention is particularly directed to an adjustable mounting bracket for accommodating wall cavities of different depths between opposing walls.

BACKGROUND OF THE INVENTION

Electrical boxes are commonly mounted on various mounting brackets for securing the electrical box to a wall stud or other support. The electrical boxes are dimensioned to support electrical receptacles, switches and other components and must be securely mounted to the wall stud. Many electrical boxes include a mounting bracket extending from one side of the electrical box so that only one side of the electrical box is supported by the bracket. The opposite side of the electrical box often does not include a support so that some movement of the electrical box can occur during use.

To provide support of opposite ends of the electrical box, a number of brackets have been proposed. Typically, the bracket includes a first member for attaching to a wall stud and a second member connected to the opposite side of the box so that both sides of the electrical box are supported to resist movement with respect to the wall.

One example of a prior support bracket is disclosed in U.S. Pat. No. 4,399,922 to Horsley. The bracket as disclosed includes an extension arm bent at a right angle to a plate that supports the electrical box. The plate has one side edge provided with holes for securing the plate to a wall stud. The extension arm is formed on the opposite end and has a length to contact a wall on the other side of the wall stud. The extension member includes a series of score lines that can be broken off for use with walls having different depths.

Another device is disclosed in U.S. Pat. No. 4,732,356 to Medlin. This device also includes a plate member for supporting an electrical box. The plate includes a first end portion for attaching to the wall stud and a second end portion having an L-shaped arm to contact the opposite wall. A separate extension plate is attached to the L-shaped arm to adjust the length of the arm for different depths between the walls.

U.S. Pat. No. 4,688,693 to Medlin discloses an outlet box stabilizer bracket having an extension formed at a right angle to the bracket to contact an opposing wall. The extension is cut from the bracket and bent from the bracket to form a central opening in the bracket.

U.S. Pat. No. 4,964,525 to Coffey et al. discloses an electrical box mounting bracket for connecting to a wall stud. The bracket includes a pair of side mounted support legs that are bent at a right angle from the bracket to engage the opposite wall.

Examples of other mounting brackets that contact the opposing wall are disclosed in U.S. Pat. No. 4,645,089 to Horsley, U.S. Pat. No. 4,533,060 to Medlin, U.S. Pat. No. 4,569,458 to Horsley, U.S. Pat. No. 4,572,391 to Medlin, and U.S. Pat. No. 4,603,789 to Medlin.

While the devices and brackets have been generally suitable for the intended purpose of supporting an electrical box, there is a continuing need in the industry for improved support brackets and methods of producing the brackets.

SUMMARY OF THE INVENTION

The present invention is directed to a mounting bracket for supporting an electrical box or other electrical component. In particular, the invention is directed to a mounting bracket for mounting an electrical component to a wall stud or other support.

A primary feature of the invention is to provide a mounting bracket for an electrical box or electrical component formed as a unitary one piece member. In one embodiment, the mounting bracket is formed from a sheet material such as steel that can be folded to a shape to support the electrical box or electrical component.

Another feature of the invention is to provide an electrical outlet box bracket that is attached to a wall stud and is able to support an electrical box by contacting an opposing wall.

A further feature of the invention is to provide a bracket for supporting an electrical box where the bracket has a support plate to contact an opposing wall and where the support plate can accommodate wall cavities of different depths. One end of the bracket can be attached to a wall stud or other support member while the support plate supports the opposite end to resist bending of the bracket.

Still another feature of the invention is to provide a bracket for supporting an electrical box where the bracket includes a support plate and an integrally formed extension plate. The extension plate can be folded in a generally outward direction with respect to the support plate to contact an opposing wall to support the electrical box.

A further feature of the invention is to provide a bracket for supporting an electrical box and mounting the electrical box to a wall stud. The bracket has a support plate extending at a right angle to the bracket and has a length to contact an opposing wall to support the bracket and resist movement of the bracket and the electrical box with respect to the wall stud. An extension plate is integrally formed with the support plate and can be folded outwardly to an extended position for contacting an opposing wall in a deep wall cavity so that the bracket can accommodate wall cavities of different depths. The extension plate can be cut from the support plate and folded outwardly to form a central opening with the support plate. In another embodiment, the extension plate is at least one and preferably two legs cut from the support plate which can be folded outwardly. In preferred embodiments, the extension plate has a bendable locking tab that can be folded over a portion of the support plate to lock the extension plate in the extended position.

These and other features of the invention are basically attained by providing an adjustable outlet box mounting bracket formed from a unitary piece of stiff sheet material. The bracket comprises a front mounting panel having a central opening with a dimension to accommodate an electrical outlet box. A plurality of first openings receive screw heads for coupling the front mounting plate to the electrical outlet box. A plurality of second openings receive fasteners for mounting the front mounting panel to a wall stud. A stabilizing plate extends from the front mounting panel at a right angle and has a first end connected to the front mounting panel and a second end to engage an opposing wall surface spaced from a front wall a first distance during use. An extension plate is coupled to the stabilizing plate at the second end and is bendable from a first position to a second extended position extending away from the stabilizing plate. The extension plate has a first end, a second end and an outer end for engaging an opposing wall surface spaced from the front wall a second distance.

The various aspects of the invention are further attained by providing an electrical box mounting bracket which comprises a front mounting panel having a central opening with a dimension to accommodate an electrical box. A plurality of first openings receive screw heads for attaching the electrical box to the front mounting panel. A plurality of second openings receive fasteners for mounting the front mounting panel to a wall stud. A stabilizing plate has a first end coupled to and extending from the front mounting panel and having a second end to engage a first opposing wall surface spaced from a front wall a first distance during use. An extension plate is coupled to the stabilizing plate about a first fold line and is bendable from a first position to an extended second position to engage a second opposing wall surface spaced from the front wall a second distance. A bendable locking tab is integrally formed with the bracket to secure the extension plate in the extended position.

The features of the invention are also attained by providing an electrical box mounting bracket which comprises a front mounting panel having a central opening with a dimension to accommodate an electrical box. A plurality of first openings receives screw heads for coupling the electrical box to the front mounting plate and a plurality of second openings for fasteners for mounting the front mounting panel to the wall stud. A stabilizing plate is coupled to a side of the front mounting panel and is bendable about a fold line to an extended position wherein an outer end of the stabilizing plate engages an opposing wall surface spaced from a front wall a first distance during use. An extension plate is integrally formed with the stabilizing plate and has a first end portion and a second end portion coupled to the outer end of the stabilizing plate by a fold line and a second end portion spaced from the first end portion. The extension plate is bendable about the fold line between a first retracted position and a second extended position where the second end portion extends away from the front mounting plate.

These and other aspects and features of the invention will become apparent from the following detailed description of the invention which taken in conjunction with the annexed drawings will become apparent to one skilled in the art.

BRIEF DESCRIPTION OF THE DRAWINGS

The following is a brief description of the drawings, in which.

DETAILED DESCRIPTION OF THE INVENTION

The present invention is directed to a mounting bracket for an electrical box or other electrical device. In particular, the invention is directed to a mounting bracket for securing an electrical box to a wall stud and supporting the electrical box in a secure manner.

Figure 1:
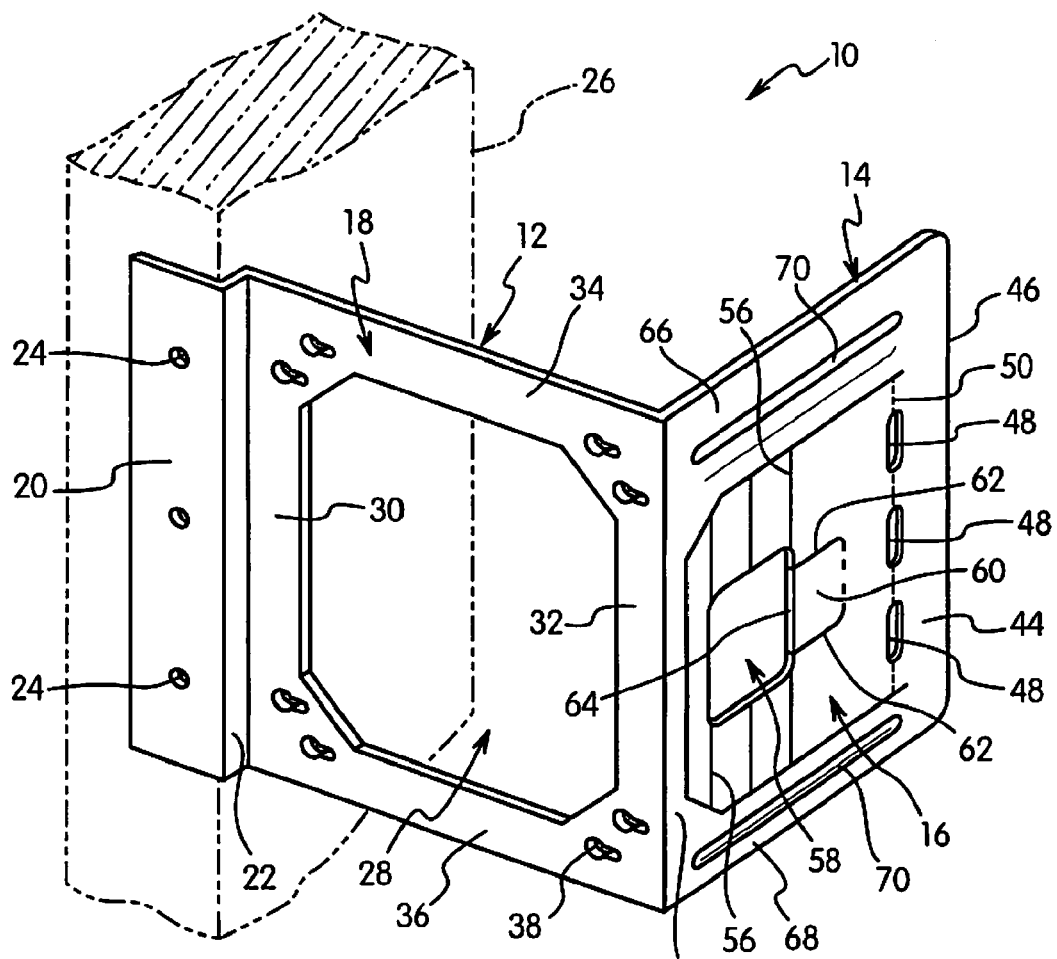
FIG. 1 is a perspective view of the mounting bracket in a first embodiment of the invention showing the stabilizing plate and extension plate.

Referring to the drawings, a first embodiment of the invention is shown in FIGS. 1-6. As shown in FIG. 1, the mounting bracket 10 includes a front mounting plate 12, a support plate 14 and an extension plate 16.

Figure 2:
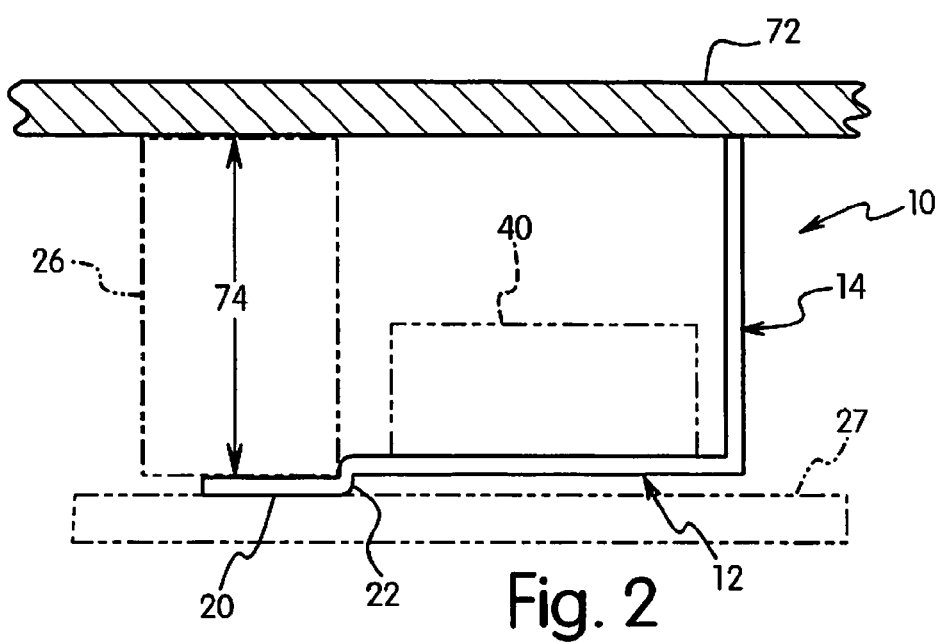
FIG. 2 is a top end view of the stabilizing plate of FIG. 1 with the extension plate in a first position and showing the wall structure.

Mounting bracket 10 in a preferred embodiment of the invention is formed from a single piece of sheet material having sufficient strength to support an electrical box during use. Typically, mounting bracket 10 is formed from a steel sheet that is cut, stamped or pierced to form a one piece unitary unit. As shown in FIG. 1, front mounting plate 12 has a substantially flat front face 18 and a side portion 20 offset from the front face 18 by a stepped portion 22. Side portion 20 in the embodiment shown has a substantially rectangular shape with a plurality of apertures 24 for receiving fasteners for securing mounting bracket 10 to a wall stud 26 or other support shown in FIG. 1. Front mounting plate 12 has a central opening 28 having a dimension to receive an electrical box or other electrical component. Central opening 28 defines first and second side sections 30 and 32. Top section 34 and bottom section 36 extend between side sections 30 and 32 to define the opening 28. Front face 18 includes a plurality of apertures 38 for receiving screws or other fasteners for attaching an electrical box 40 to front plate 12 as shown in FIG. 2.

Support plate 14 in the embodiment of FIGS. 1-8 extends substantially perpendicular to front plate 12 in a direction away from front face 18. Support plate 14 has a first inner section 42 connected to side section 32 of front plate 12. Support plate 14 has a second end section 44 forming an outer end 46 spaced from front plate 12.

Figure 3:
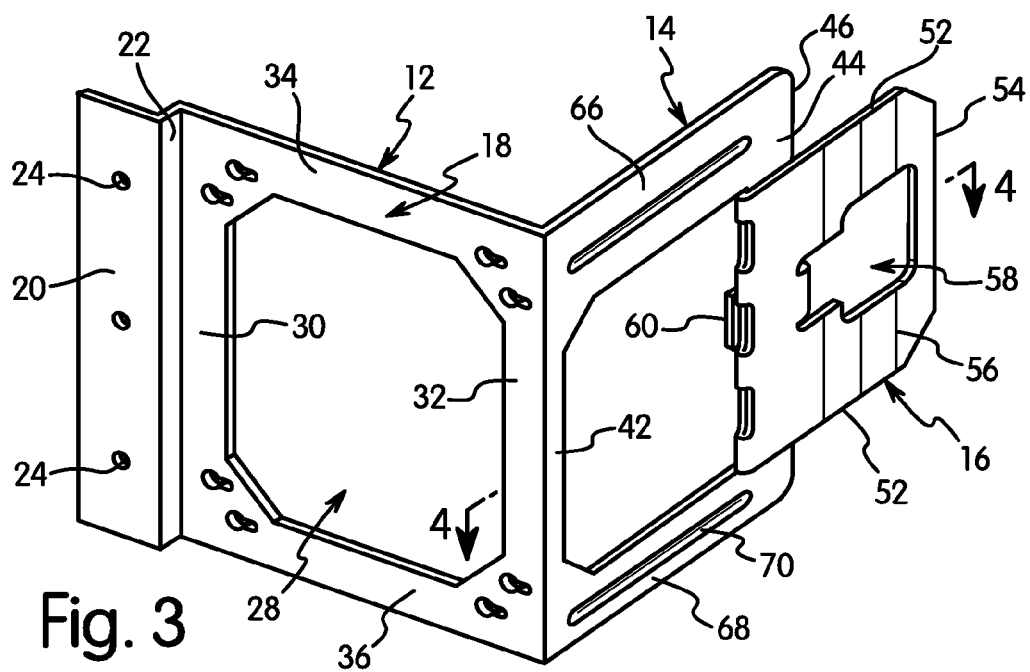
FIG. 3 is a perspective view of the mounting bracket of FIG. 1 showing the extension plate in a second extended position.
Figure 4:
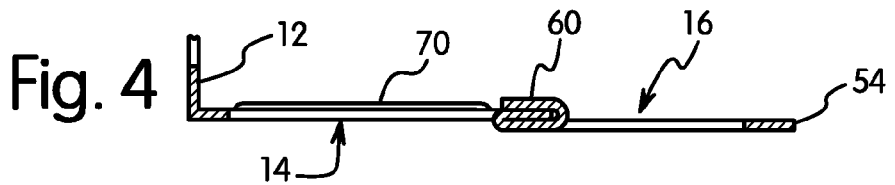
FIG. 4 is a cross-sectional view of the mounting bracket of FIG. 1 taken along line 4-4 of FIG. 3 showing the locking tab coupled to the support plate.

Extension plate 16 is integrally formed with support plate 14 and is cut or stamped from support plate 14 as shown in FIG. 1. A plurality of elongated apertures 48 are pierced in support plate 14 to define a fold line 50 between support plate 14 and extension plate 16. Extension plate 16 has side edges 52 and an outer edge 54 as shown in FIG. 3. A plurality of spaced apart score lines that define fold lines 56 are formed in extension plate 16 that are substantially parallel to fold line 50. Fold lines 56 are typically formed by stamping so that portions of extension plate 16 can be folded to reduce the effective length of extension plate 16. A central opening 58 is formed in extension plate 16 by cutting or stamping. In the embodiment illustrated, a locking tab 60 is cut from central opening 58 into extension plate 16 in a direction toward fold line 50 as shown in FIG. 1. Locking tab 60 includes side edges 62 and an outer edge 64. Extension plate 16 is cut to form top and bottom sections 66 and 68, respectively, in support plate 14 that extend in a direction substantially perpendicular to front plate 12. An embossed strengthening rib 70 is formed in each top and bottom section 66 and 68 to strengthen support plate 14 and resist bending or buckling.

In use, electrical box 40 is coupled to front plate 12 and side portion 20 is attached to wall stud 26. Wall stud 26 supports a front wall 27 in phantom lines that overlies mounting bracket 10 in a conventional manner. An opposing rear wall 72 is attached to wall stud 26 on a side opposite mounting bracket 10. Referring to FIG. 2, wall stud 26 has a dimension indicated by arrow 74. Support plate 14 has a length extending from front plate 12 corresponding substantially to the dimension of wall stud 26 so that the end 46 of support plate 14 contacts wall 72 to stabilize one end of the front plate 12. Mounting bracket 10 is cantilevered from wall stud 26 by side portion 20. To prevent front plate 12 from flexing or bending in a direction toward wall 72, support plate 14 has a dimension to contact wall 72 and support mounting bracket 10.

Figure 5:
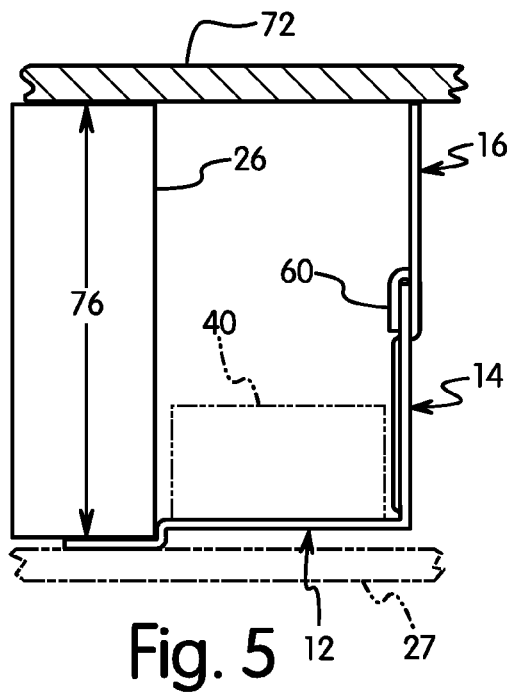
FIG. 5 is an end view of the mounting bracket of FIG. 1 showing the extension plate in the extended position contacting a wall.

Mounting bracket 10 is able to accommodate wall structures having different depths by selectively adjusting the effective length of support plate 14. For example, opposing wall 72 can be spaced a distance greater than the distance 74 shown in FIG. 2. Referring to FIG. 5, a wall stud 26 indicated by arrow 76 where opposing wall 72 is spaced from a front wall a distance greater than the length of support plate 14. In this embodiment, extension plate 16 is folded outwardly from support plate 14 along fold line 50 from a first position shown in FIG. 1 to a second position shown in FIG. 3 where extension plate 16 extends away from support plate 14. In the illustrated embodiment, extension plate 16 is folded flat against support plate 14 to be parallel thereto. As shown in FIG. 3, outer edge 54 of extension plate 16 is spaced from front plate 12 a distance to accommodate the depth of a wall cavity as shown in FIG. 5. As shown in the cross-section of FIG. 4, locking tab 60 is folded over the outer end 46 of support plate 14 to effectively lock extension plate 16 in an extended position with respect to support plate 14. As shown in FIG. 5, extension plate 16 effectively increases the length of support plate 14 to engage the opposing wall 72 to prevent flexing of the front plate 12 and movement of the electrical box during use.

Figure 6:
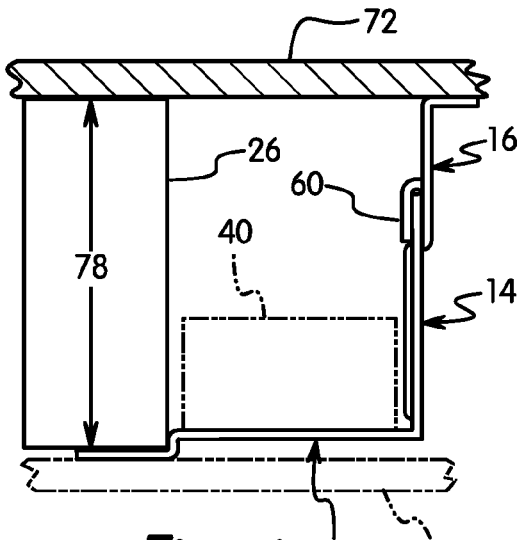
FIG. 6 is an end view of the mounting bracket of FIG. 1 showing the extension plate in a shortened form to contact a wall.

Referring to FIG. 6, wall stud 26 can have a dimension indicated by arrow 78 that is less than the dimension 76 of wall stud 26 of FIG. 5. The wall stud 26 shown in FIG. 6 having the dimension indicated by arrow 78 forms a wall cavity having a dimension less than the combined length of support plate 14 and extension plate 16 when folded to the extended position. As shown in FIG. 6, extension plate 16 can be folded along one of the fold lines 56 to effectively shorten the length of extension plate 16 so that the folded portion of the extension plate contacts the opposing wall 72 while it supports front plate 12 in a position substantially parallel to opposing wall 72.

In the embodiment of FIGS. 1-6, mounting bracket 10 is able to accommodate wall structures having different cavity depths by folding the extension plate outwardly and where necessary folding the extension plate about the fold lines to reduce the overall length of the support plate and extension plate. In one preferred embodiment, support plate 14 has a length corresponding to the minimum depth of a standard wall structure which can be, for example, about 3.5 inches. In wall structures having a depth greater than the length of the support, the extension plate is folded outward and locked into place so that the end of the extension plate can contact the opposing wall. In the event the depth of the wall cavity is less than the combined length of the support plate and the extension plate, the effective length of the extension plate can be reduced by folding along one or more of the fold lines. The resulting tab formed by folding the extension plate along the fold line can be folded 90° as shown in the drawings or folded 180° to lay flat against the support plate or extension plate.

The locking tab as shown in the illustrated embodiment is integrally formed with the structure and folded over to clamp the extension plate in the extended position with respect to the support plate. In the illustrated embodiment, the locking tab is cut from the extension plate and positioned to fold over the outer end of the support plate. In alternative embodiments, the locking tab is formed with the support plate which can be folded over the extension plate to lock the extension plate in the extended position. In another embodiment, a separate fastener, clip or locking member can be coupled to the extension plate and/or support plate to lock the extension plate in the extended position.

Embodiment of FIGS. 7-13

Figure 7:
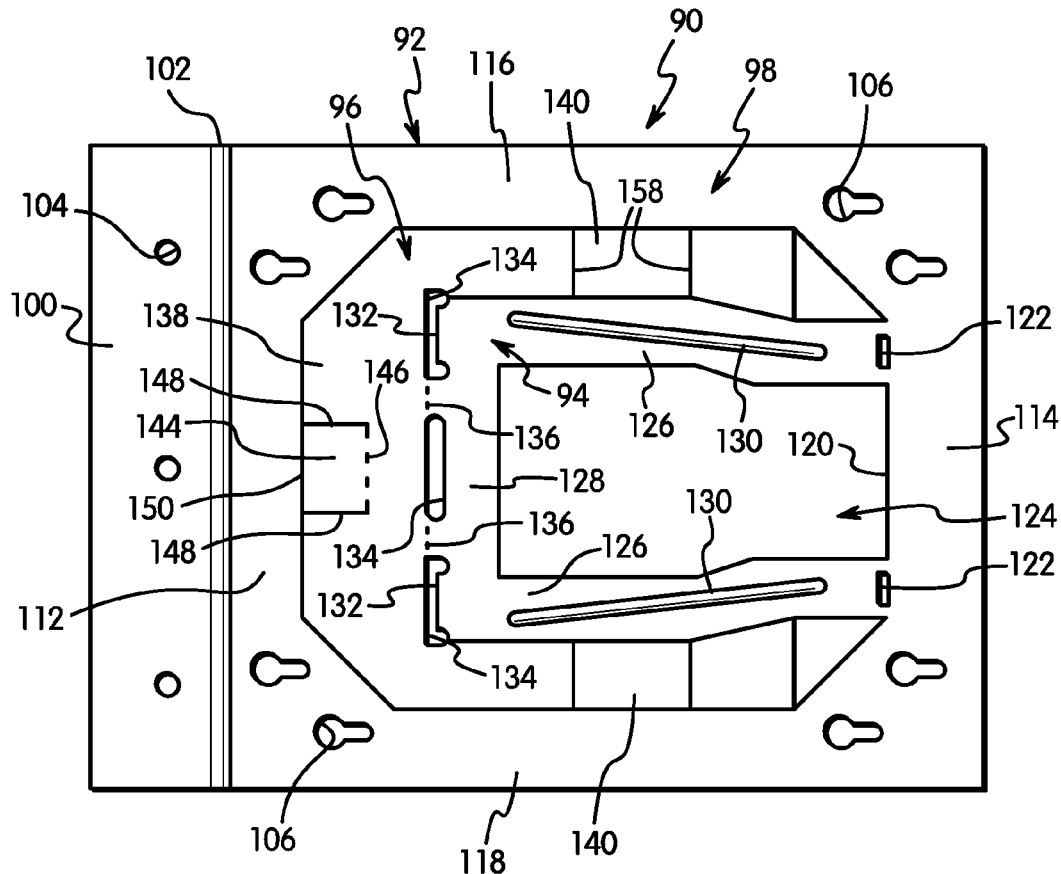
FIG. 7 is a top plan view of a cut blank for forming a mounting bracket in a second embodiment of the invention.
Figure 8:
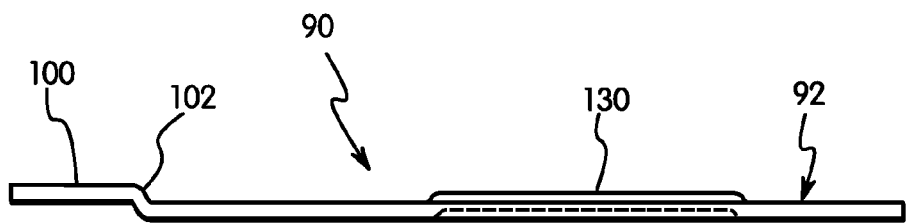
FIG. 8 is an end view of the bracket of FIG. 7.

In a second embodiment of the invention, a mounting bracket 90 is formed from a cut or stamped blank of sheet material as shown in FIG. 7. Mounting bracket 90 includes a front plate 92 defining a front mounting panel, a support plate 94 and an extension plate 96. As shown in FIG. 7, front plate 92, support plate 94 and extension plate 96 are integrally formed and connected together by fold lines as discussed hereinafter in greater detail.

Front plate 92 includes a front face 98 and a side portion 100 connected to front face 98 by a stepped portion 102 to offset front face 98 with respect to side portion 100. Side portion 100 includes a plurality of holes 104 for receiving fasteners to attach side portion 100 to a wall stud or other support surface. Front face 98 includes a plurality of holes 106 for receiving fasteners for coupling an electrical box to front mounting plate 92.

Figure 9:
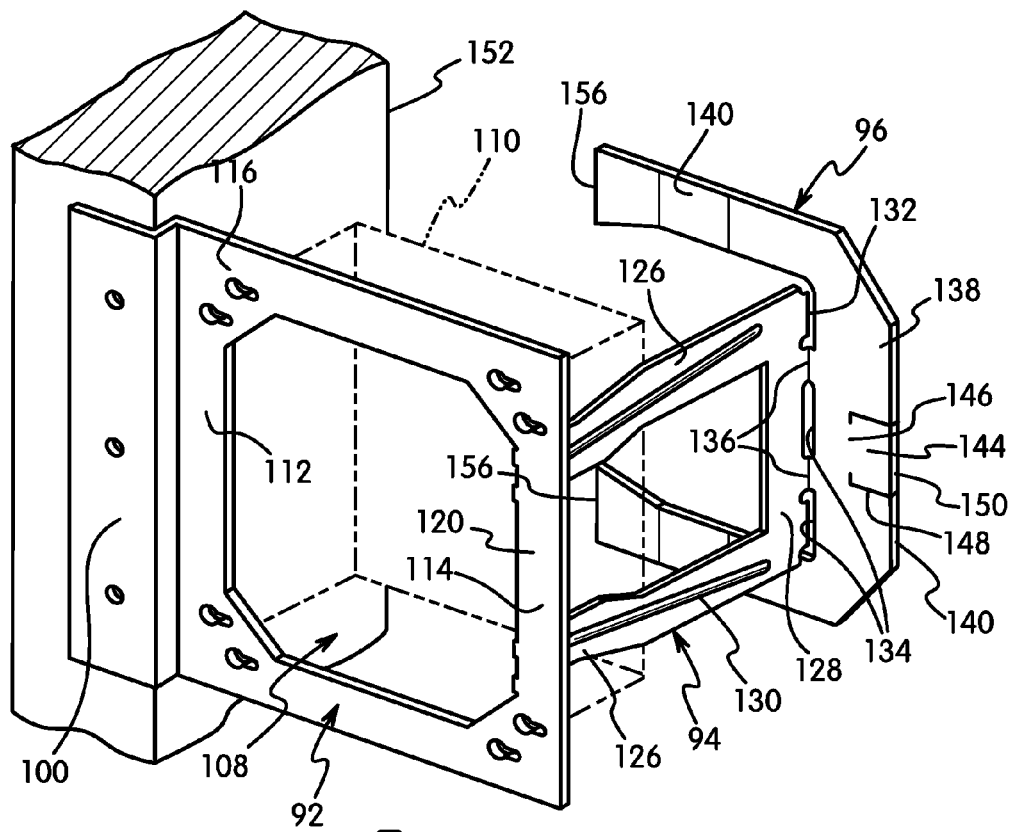
FIG. 9 is a perspective view of the folded bracket of FIG. 7.

Support plate 94 and extension plate 96 are cut from the blank and bent outwardly from front plate 92 as shown in FIG. 9 to form a central opening 108. Central opening 108 has a dimension to accommodate the electrical box 110 and defines first and second side sections 112 and 114. A top section 116 and a bottom section 118 extend between side sections 112 and 114 as shown in FIG. 9.

Support plate 94 is connected to the inner edge 120 of central opening 108 alongside section 114. Elongated slots 122 define a fold line between side section 114 and support plate 94 as shown in FIG. 7. Support plate 94 includes a central opening 124 to define a pair of legs 126 and an outer end portion 128. Embossed ribs 130 are formed along the length of legs 126 to strengthen legs 126 during use. Outer end portion 128 has an outer edge 132.

Extension plate 96 is integrally formed with support plate 94 and coupled to outer edge 132 of extension plate 96. Elongated slots 134 are formed to define a fold line 136 between support plate 94 and extension plate 96. Extension plate 96 in this embodiment includes an end portion 138 and a pair of legs 140 extending from end portion 138. Legs 140 are cut from the blank adjacent legs 126 of support plate 94 as shown in FIG. 7. End portion 138 is connected to support plate 94 along fold line 136. End portion 138 includes an edge 140 having a locking tab 144 cut from end portion 138. Locking tab 144 is connected to end portion 138 by a fold line 146 and includes side edges 148 and an outer edge 150.

Figure 10:
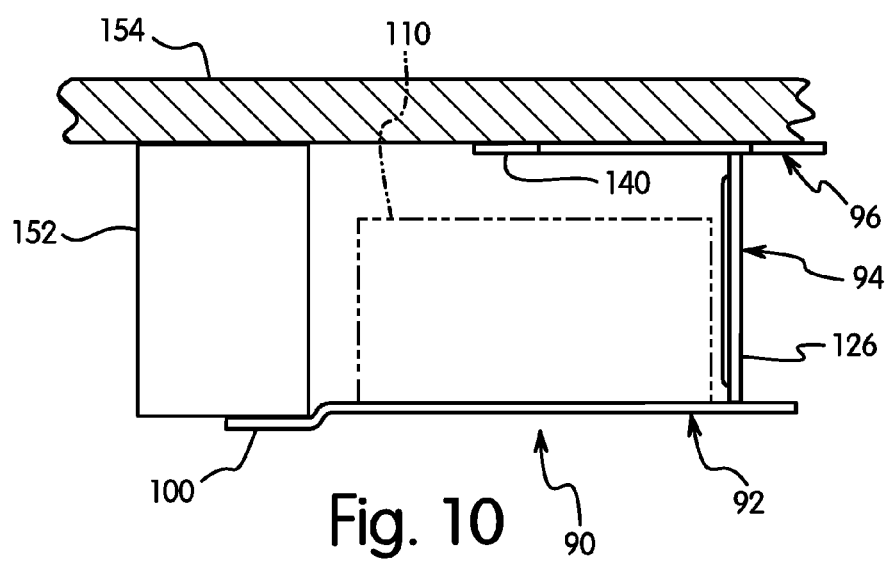
FIG. 10 is an end view of the folded bracket of FIG. 7 showing the stabilizing plate contacting an opposing wall.

In use, mounting bracket 90 is folded to the position shown in FIG. 9 where support plate 94 is substantially perpendicular to front plate 92 and extension plate 96 is folded with respect to support plate 94 to be substantially parallel with front plate 92 and perpendicular to support plate 94. Bending support plate 94 and extension plate 96 forms central opening 108 as shown in FIG. 9 to allow the electrical box 110 to be coupled to front plate 92 and to allow access to the interior of electrical box 110. As shown in FIG. 10, side portion 100 of front plate 92 is attached to a wall stud 152 by suitable fasteners such as nails or screws. As in the previous embodiment, wall stud 152 supports a front wall (not shown) and an opposing wall 154 as shown in FIG. 10. As shown in FIG. 10, support plate 94 has a length substantially equal to the dimension of wall stud 152. In this manner, the outer edge 132 of support plate 94 and the face of extension plate 94 contact opposing wall 154 to support the end of mounting bracket 90 and prevent bending or flexing of front plate 92 with respect to side portion 100 and wall stud 152.

Figure 11:
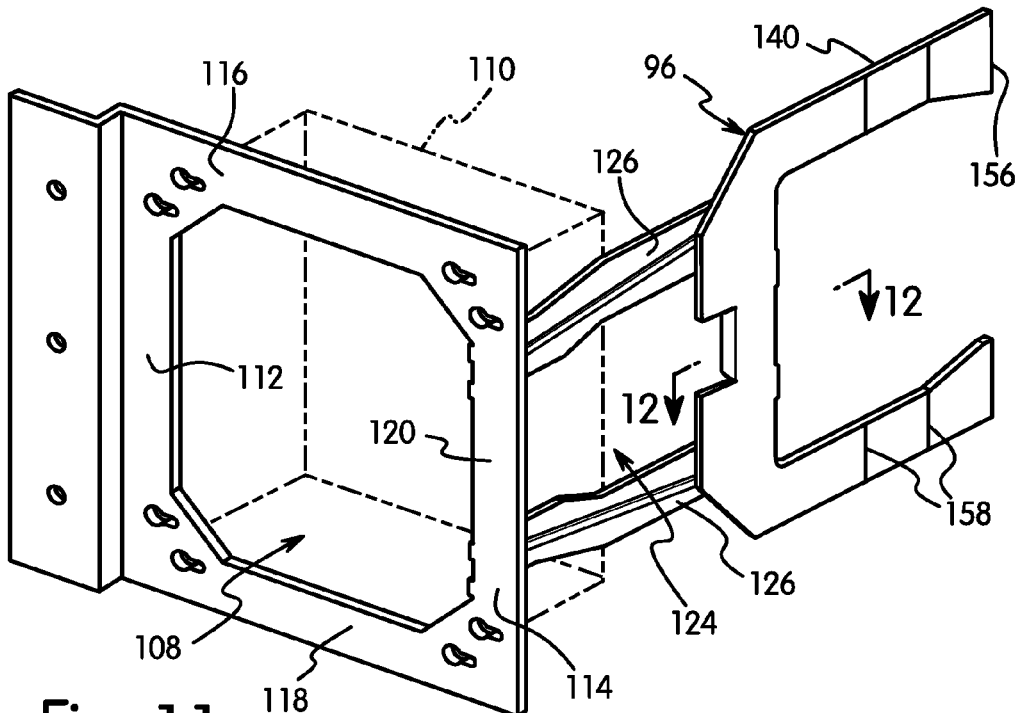
FIG. 11 is a perspective view of the mounting bracket of FIG. 7 showing the extension plate in the extended position.
Figure 12:
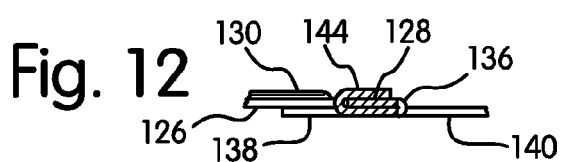
FIG. 12 is a partial cross-sectional view of the locking tab folded over the stabilizing plate.
Figure 13:
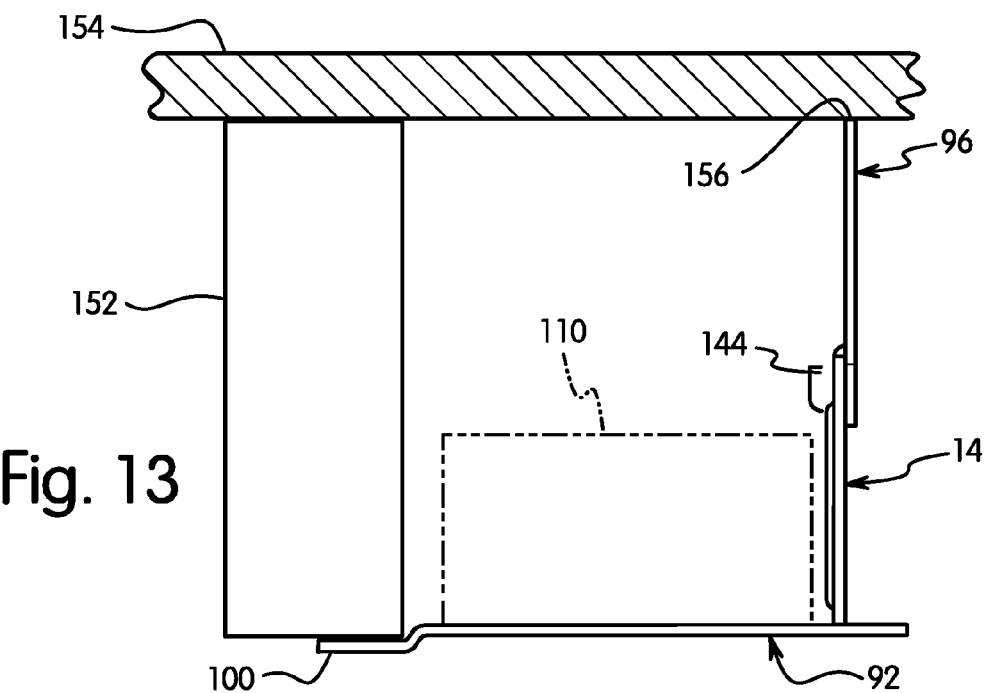
FIG. 13 is an end view of the mounting bracket attached to a wall stud and showing the extension plate in the extended position.

As in the previous embodiment, mounting bracket 90 is able to accommodate a wall cavity having different depths and dimensions. Referring to FIG. 11, extension plate 96 is folded along fold line 136 so that extension plate 96 is substantially parallel to support plate 94. As shown in FIG. 12, locking tab 144 is folded along fold line 146 over the inner edge of outer end portion 128 to secure extension plate 96 in an extended position with respect to support plate 94. As shown in FIG. 13, the combined length of support plate 94 and extension plate 96 complements the dimension of wall stud 152 so that an outer end 156 of legs 140 contact opposing wall 154 to support mounting bracket 90. As in the previous embodiment, legs 140 include a plurality of spaced-apart fold lines so that the effective length of extension plate 96 can be shortened to accommodate the dimension of the wall cavity defined by the opposing wall 154 and wall stud 152 by bending legs 140 along the selected fold line 158. The extension plate 96 is shortened in a manner similar to the previous embodiment by folding along the fold lines 158. The resulting tab can be folded to be perpendicular to the extension plate or folded parallel to the extension plate.

While various embodiments have been chosen to illustrate the invention, it will be understood by those skilled in the art that various changes and modifications can be made without departing from the scope of the invention as defined in the appended claims.

What is claimed is:

1. An adjustable outlet box mounting bracket formed from a unitary piece of stiff sheet material, said bracket comprising:
   a front mounting panel having a central opening with a dimension to accommodate an electrical outlet box, a plurality of first openings in said front mounting panel for receiving screw heads for coupling the electrical outlet box to said front mounting panel in alignment with said central opening, and a plurality of second openings for receiving fasteners for mounting said front mounting panel to a wall stud;
   a stabilizing member extending from said front mounting panel at a right angle and having a first end connected to an inner edge of said front mounting panel and a second end to engage an opposing wall surface spaced from said front mounting panel a first distance during use; and
   an extension member having a first end coupled to said stabilizing member at said second end and extending toward said mounting panel in a retracted first position, said extension member being bendable about a fold line to a second extended position extending away from said stabilizing member, said extension member having an outer end for engaging an opposing wall surface spaced from said front mounting panel a second distance when said extension member is in said second extended position, said extension member being integrally formed with said stabilizing member and being coplanar with said stabilizing member in said first position.

2. The mounting bracket of claim 1, wherein said extension member is bendable to a position substantially perpendicular to said stabilizing member.

3. The mounting bracket of claim 1, wherein said second end of said stabilizing member defines an outer edge of said stabilizing member, and where said extension member is coupled to said outer edge by said fold line.

4. The mounting bracket of claim 1, wherein said extension member has a first portion coupled to said stabilizing member and a pair of legs extending from said first portion, the legs extending parallel to said stabilizing member and toward said front mounting panel when in said first position.

5. The mounting bracket of claim 4, wherein wherein said extension member includes an integrally formed locking tab cut from said extension member and being bendable to couple to said second end of said stabilizing member to retain said extension member in said extended position.

6. The mounting bracket of claim 5, wherein said stabilizing member has a central opening with an inner edge, and where said locking tab is foldable over said inner edge of said central opening of said stabilizing member.

7. The mounting bracket of claim 5, wherein said locking tab is bendable to bend over said stabilizing member to fix said extension plate in an extended position with respect to said stabilizing plate.

8. The mounting bracket of claim 1, wherein said outer end of said extension member includes a plurality of parallel score lines adaptable to be folded to shorten said extension member to a desired length.

9. The mounting bracket of claim 1, wherein said fold line is positioned between an outer edge of said stabilizing member and an inner edge of said extension member.

10. The mounting bracket of claim 9, wherein said extension member includes a pair of legs having an end defining said outer end of said extension member.

11. The mounting bracket of claim 10, wherein said legs are oriented parallel to and adjacent said stabilizing member when said extension is in said first position, and wherein said legs extend away from said stabilizing member when in said second extended position.

12. The mounting bracket of claim 1, wherein said extension member is bendable between a position substantially parallel to said front mounting panel and said second position substantially perpendicular to said front mounting panel.

13. The mounting bracket of claim 12, wherein said extension member includes an integral locking tab that is bendable to couple to said stabilizing member to secure said extension member in said second position.

14. The mounting bracket of claim 1, further comprising a locking member for locking said extension member and stabilizing member together in said second extended position.

15. An electrical box mounting bracket comprising:
   a front mounting panel having a central opening with an inner edge, said front mounting panel having a dimension to accommodate an electrical box;
   a stabilizing member having a first end coupled to said inner edge of said front mounting panel and a second end opposite said first end;

an extension member coupled to said stabilizing member about a first fold line and being bendable from a first position to an extended second position to engage a second opposing wall surface spaced from the front wall a second distance; and a bendable locking member cooperating with said stabilizing member and said extension member to secure said extension member and stabilizing member together in said extended position.

16. The electrical box mounting bracket of claim 15, wherein
said stabilizing member is bendable along a fold line to a position substantially perpendicular to said front mounting panel.

17. The electrical box mounting bracket of claim 15, wherein
said extension member is coupled to said second end of said stabilizing member by a fold line and where said extension member is coplanar with said stabilizing member in said first position.

18. The electrical box mounting bracket of claim 15, wherein
said extension member is oriented substantially parallel to said front mounting panel when in said first position, and wherein said extension member is substantially perpendicular to said front mounting panel when in said second extended position.

19. The electrical box mounting bracket of claim 15, wherein
said stabilizing member is integrally formed with said inner edge and bendable outwardly from said front mounting panel to form said central opening in said front mounting panel.

20. The electrical box mounting bracket of claim 15, wherein
said stabilizing member has a central opening with an inner edge, and said locking member is a tab that is foldable over said inner edge of said central opening of said stabilizing member.

21. The electrical box mounting bracket of claim 15, wherein
said extension member has a first portion integrally formed with said stabilizing member and a second portion extending from said first portion of said extension member, said second portion of said extension member having an outer end for engaging the opposing wall in the second extended position.

22. The electrical box mounting bracket of claim 15, wherein
said extension member is bendable to a position substantially perpendicular to said stabilizing member to engage said first opposing wall surface.

23. The electrical box mounting bracket of claim 15, wherein said locking member comprises
a locking tab integrally formed with said extension member and being bendable over an inner edge of said stabilizing member to secure said extension member in said second position.

24. An electrical box mounting bracket comprising:
a front mounting panel having a central opening with a dimension to accommodate an electrical box, said front mounting panel having a plurality of first openings for receiving screw heads for coupling the electrical box to said front mounting plate and a plurality of second openings for fasteners for mounting said front mounting panel to a wall stud;

a stabilizing member coupled to a side of said front mounting panel and being bendable about a fold line to an extended position wherein an outer end of said stabilizing member engages an opposing wall surface spaced from a front wall a first distance during use; and an extension member integrally formed with said stabilizing member, said extension member having a first end portion coupled to said outer end of said stabilizing member by a fold line and a second end portion spaced from said first end portion, said extension member being bendable about said fold line between a first retracted position where said extension member is coplanar with said stabilizing member and a second extended position where said second end portion extends away from said front mounting panel to engage an opposing wall surface spaced from the front wall a second distance during use.

25. The electrical box mounting bracket of claim 24, wherein
said second end portion of said extension member includes a pair of legs extending from said extension member and being bendable from said first position to a position where said extension member is perpendicular to said stabilizing member.

26. The electrical box mounting bracket of claim 24, wherein
said extension member includes a locking tab that is foldable over said stabilizing member to secure said extension plate in said extended position.

27. The electrical box mounting bracket of claim 24, wherein
said extension member includes a central opening with an inner edge and a locking tab foldable over said inner edge of said central opening of said stabilizing member.

28. The electrical box mounting bracket of claim 24, wherein
said stabilizing member and extension member are removed from a center portion of said front mounting plate to form said central opening in said front mounting plate, said central opening having an inner edge and where said stabilizing member is coupled to said inner edge.

29. The electrical box mounting bracket of claim 24, wherein
said extension member includes at least one fold line adapted to shorten a length of said extension member.

30. An electrical box and mounting bracket assembly, the mounting bracket assembly comprising:
a stabilizing member having a first end and a second end extending away from said first end for engaging an opposing wall surface spaced from a front wall a first distance; and an extension member integrally formed with said stabilizing member, said extension member having a first end and a second end, said first end connected to said second end of said stabilizing member by a fold line and being oriented in the same plane of said stabilizing member in a first position with said second end extending toward said first end of said stabilizing member, said extension member being foldable about said fold line to an extended position where said second end of said extension member extends away from said first end of said stabilizing member a second distance to engage an opposing wall.

31. The assembly of claim 30, further comprising
a bendable locking tab for locking said extension member and stabilizing member together in the extended position.

32. The assembly of claim 31, wherein
said locking tab is formed on said extension member and is bendable over said stabilizing member.

33. The assembly of claim 30, wherein
said stabilizing member has an outer edge and a central opening defining an inner edge, and where said extension member is coupled to said inner edge.

34. The assembly of claim 30, wherein
said stabilizing member has an outer edge at said second end, and
said extension member has a first portion coupled to said outer edge by said fold line and a second portion extending from said first portion, said first portion having an outer edge extending away from said stabilizing member when said extension member is in said first position.

35. The assembly of claim 34, wherein
said second portion of said extension member includes two legs extending from said first portion.

* * * * *